US012030086B2

(12) United States Patent
Zungeru et al.

(10) Patent No.: US 12,030,086 B2
(45) Date of Patent: Jul. 9, 2024

(54) METHOD AND SYSTEM FOR SORTING OF DIAMONDS

(71) Applicant: BOTSWANA INTERNATIONAL UNIVERSITY OF SCIENCE AND TECHNOLOGY, Palapye (BW)

(72) Inventors: Adamu Murtala Zungeru, Palapye (BW); Ernest Gomolemo Modise, Palapye (BW); Joseph Monamati Chuma, Palapye (BW)

(73) Assignee: BOTSWANA INTERNATIONAL UNIVERSITY OF SCIENCE AND TECHNOLOGY, Palapye (BW)

( * ) Notice: Subject to any disclaimer, the term of this patent is extended or adjusted under 35 U.S.C. 154(b) by 0 days.

(21) Appl. No.: 18/043,809

(22) PCT Filed: Sep. 2, 2020

(86) PCT No.: PCT/IB2020/058155
§ 371 (c)(1),
(2) Date: Mar. 2, 2023

(87) PCT Pub. No.: WO2022/049408
PCT Pub. Date: Mar. 10, 2022

(65) Prior Publication Data
US 2023/0294136 A1   Sep. 21, 2023

(51) Int. Cl.
*B07C 5/34* (2006.01)
*G01N 23/083* (2018.01)
*G01N 23/223* (2006.01)

(52) U.S. Cl.
CPC ......... *B07C 5/3416* (2013.01); *G01N 23/083* (2013.01); *G01N 23/223* (2013.01); *G01N 2223/604* (2013.01)

(58) Field of Classification Search
CPC ...... B07C 5/3416; B07C 5/36; G01N 23/083; G01N 23/223; G01N 2223/604
See application file for complete search history.

(56) References Cited

U.S. PATENT DOCUMENTS

| 5,206,699 A * | 4/1993 | Stewart | B07C 5/3425 |
| | | | 209/579 |
| 7,763,820 B1 * | 7/2010 | Sommer, Jr. | B07C 5/346 |
| | | | 209/579 |
| 8,855,809 B2 * | 10/2014 | Spencer | B07C 5/346 |
| | | | 378/53 |

FOREIGN PATENT DOCUMENTS

| GB | 2285506 | 7/1995 |
| RU | 2154537 | 8/2000 |

(Continued)

OTHER PUBLICATIONS

International Search Report and Written Opinion of the International Searching Authority for International Application No. PCT/IB2020/058155 dated Apr. 30, 2021, 10 pages.

(Continued)

*Primary Examiner* — Michael McCullough
*Assistant Examiner* — Kalyanavenkateshware Kumar
(74) *Attorney, Agent, or Firm* — Heslin Rothenberg Farley & Mesiti P.C.

(57) ABSTRACT

A system for sorting of diamonds is provided. The system comprises a conveying system including a conveyer belt to transport material sample including diamonds. Further, the system comprises an x-ray source configured to fire x-rays at the material sample. Furthermore, the system comprises an x-ray luminescence (XRL) detector configured to measure radiated intensity of the x-rays from the material sample. Additionally, the system comprises an x-ray transmission (XRT) detector configured to measure transmitted intensity of the x-rays through the material sample. Also, the (Continued)

system comprises a processor that is configured to: receive the radiated intensity and the transmitted intensity from the XRL detector and the XRT detector respectively; process the radiated intensity and the transmitted intensity to determine an equivalent absorption coefficient; and identify the material sample as diamond based on a comparison of the equivalent absorption coefficient and a pre-stored model species absorption coefficient.

10 Claims, 6 Drawing Sheets

(56) References Cited

FOREIGN PATENT DOCUMENTS

| WO | 8801378 | 2/1988 |
|---|---|---|
| WO | 2013033572 | 3/2013 |

OTHER PUBLICATIONS

International Preliminary Report on Patentability for International Application No. PCT/IB2020/058155 dated Feb. 14, 2023, 5 pages, Austrian Patent Office.

\* cited by examiner ly known x-ray diamond sorting systems and methods are Tomra X-ray transmission (XRT) and De Beers Technology (XRT and X-ray luminescence—XRL) and Bouervestnik (XRL and XRT) machines. Such current systems are all based on carbon signature using atomic density as a detection method.

METHOD AND SYSTEM FOR SORTING OF DIAMONDS

CROSS REFERENCE TO RELATED APPLICATIONS

This application claims priority benefit from International Application No. PCT/IB2020/058155 filed on Sep. 2, 2020, entitled "Method and System For Sorting of Diamonds", which is incorporated herein by reference in its entirety.

FIELD OF THE INVENTION

This invention relates to sorting of diamonds, and in particular, relates to x-ray sensor-based methods and systems for identifying and sorting partly/fully liberated diamonds in kimberlite.

BACKGROUND OF THE INVENTION

Sorting diamonds (and other gemstones) is necessary to separate synthetic materials from natural ones. Currently known x-ray diamond sorting systems and methods are Tomra X-ray transmission (XRT) and De Beers Technology (XRT and X-ray luminescence—XRL) and Bouervestnik (XRL and XRT) machines. Such current systems are all based on carbon signature using atomic density as a detection method.

Currently the two sorting techniques (XRT and XRL) are used mutually exclusively and for the following reasons. First, the XRL measurements suffer from self-absorption for large diamonds, e.g., greater than 10 mm, and for high x-ray energy, the self-absorption phenomena is aggravated. The XRL measurements are generally used for diamonds less than 10 mm, typically between 1.25 mm to 8 mm. Second, the XRT measurements suffer from poor contrast for particles in the size range of 1.25 mm to 8 mm, making it difficult to detect particles in this class. The XRT is generally detrimental to the diamond recoveries for the size range below 8 mm.

Additionally, for sorting out large materials ranging from 1.25 mm to 100 mm, current methods generally require two machines, i.e., one XRT machine and an XRL machine, which may substantially raise the sorting costs.

Accordingly, there is a need for a system that solves the above-discussed problems of self-absorption and contrasts as well as a low-cost solution for sorting.

SUMMARY OF THE INVENTION

This invention relates to the sorting of a mass of particles into desired and undesired fractions. In one application of the invention it can be used to sort a mass of ore particles into desired and undesired fractions. One particular application of the invention is in the sorting of diamonds or diamondiferous material from non-diamond or non-diamondiferous material.

The present invention seeks to provide a solution to all the above stated problems by providing an integrated system for sorting/identifying diamonds.

According to one embodiment of the present invention, a system for sorting of diamonds is provided. The system comprises a conveying system comprising a conveyer belt to transport material sample including diamonds. Further, the system comprises an x-ray source configured to emit x-rays at the material sample. Furthermore, the system comprises an x-ray luminescence (XRL) detector, placed around the conveyer belt, configured to measure radiated intensity of the x-rays from the material sample. Additionally, the system comprises an x-ray transmission (XRT) detector, placed below the conveyer belt, configured to measure transmitted intensity of the x-rays through the material sample. Also, the system comprises a processor that is configured to: receive measurements of the radiated intensity and the transmitted intensity from the XRL detector and the XRT detector respectively; process the radiated intensity and the transmitted intensity to determine an equivalent absorption coefficient; and identify the material sample, or part of the material sample, as diamond based on a comparison of the equivalent absorption coefficient and a pre-stored model species absorption coefficient.

The processor may be configured to process the measurements of the radiated intensity and the transmitted intensity by inverting each of the measurements the radiated intensity and the transmitted intensity.

The x-ray source may be configured to emit x-rays in a pre-defined sensing zone on the conveyer belt. The x-ray source may be configured to emit the x-rays, the pre-defined sensing zone, at a single energy level.

The system may further comprise an x-ray generator, wherein the x-ray generator is configured to provide a series of stepped-up voltage signals to the x-ray source. The x-ray source may be configured to emit the x-rays, at the pre-defined sensing zone, at a plurality of energy levels corresponding to the series of stepped-up voltage signals. The plurality of energy levels may correspond to a series of energy levels in a range of 1 keV to 150 keV.

To identify the material sample as diamond, the processor may be configured to determine that a result of the comparison between the equivalent absorption coefficient and the pre-stored model species absorption coefficient lies in a pre-defined range.

The system may further comprise a pneumatic ejector, wherein the pneumatic ejector is configured to emit at a coordinate (x, y) of the conveyer belt in response to identification of the material sample as diamond.

The invention extends to a method of sorting diamonds, the method comprising:
transporting, by a conveying system comprising a conveyer belt, a material sample including diamonds;
emitting, by an x-ray source, x-rays at the material sample;
measuring, by an x-ray luminescence (XRL) detector placed around the conveyer belt, radiated intensity of the x-rays from the material sample;
measuring, by an x-ray transmission (XRT) detector placed below the conveyer belt, transmitted intensity of the x-rays through the material sample; and
receiving, by a processor, measurements of the radiated intensity and the transmitted intensity from the XRL detector and the XRT detector respectively;
processing, by the processor, the radiated intensity and the transmitted intensity measurements to determine an equivalent absorption coefficient; and
identifying the material sample, or a part of the material sample, as diamond based on a comparison between the equivalent absorption coefficient and a pre-stored model species absorption coefficient.

BRIEF DESCRIPTION OF THE DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention. It is emphasized that, in accordance with the standard practice in the industry, various features are not drawn to scale. The foregoing and other objects, features and advantages of the invention are apparent from the following detailed description taken in conjunction with the accompanying drawings.

Some embodiments of the present invention are illustrated as an example and are not limited by the figures or measurements of the accompanying drawings, in which like references may indicate similar elements and in which.

DETAILED DESCRIPTION OF THE INVENTION

Figure 1:
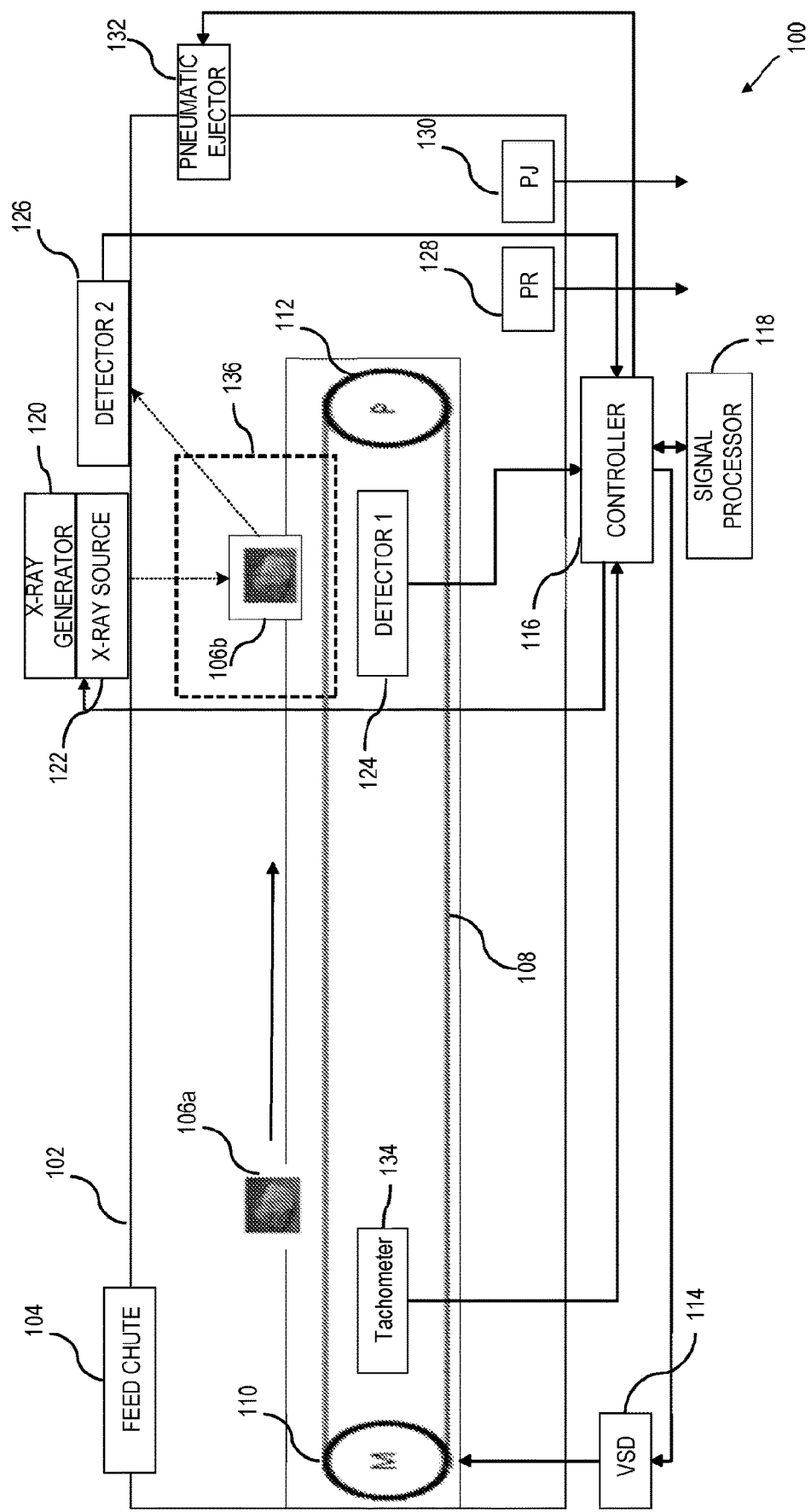
FIG. 1 depicts a system 100 for identifying and sorting partly/fully liberated diamonds in kimberlite, in accordance with the various embodiments of the present invention.

The present invention will now be described by referencing the appended figures representing example embodiments.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

In accordance with various embodiments of the present invention, a material (e.g. kimberlite rocks) which is assumed to contain diamonds and waste rocks is admitted into a diamond sorter through a randomizing/feed chute. The purpose of the randomizing/feed chute is to ensure that no two particles are sitting on top of each other. The particles free fall on the randomizing/feed chute and attain a speed equal to the speed of a conveyor belt of the system. This is to avoid particles from jumping around and possibly reaching the sensing areas while still with a relative motion between them and the conveyor. The conveyor belt transports the particles to a sensing zone.

The sensing zone consists of an x-ray luminescence (XRL) detector with plural sensors covering the entire cross-section of the conveyor belt, and an x-ray transmission (XRT) detector with plural sensors covering the entire cross-section of the belt. The XRL detector is placed at a suitable angle above the conveyor belt or placed at right angles in the free fall path of the material. The transmission detector is placed directly below the conveyor belt.

An x-ray source is placed vertically above the XRT detector, while the XRL detector is placed at a suitable angle from the normal between the XRT detector and the x-ray sources. The two detectors each capture the radiated intensity from the sample. If geometry does not allow due to the physical dimensions of the machine enclosure, two x-ray sources may be used, so that each detector is associated with its own source. The measured intensities from the two detectors are inverted to give an equivalent absorption coefficient by the use of an algorithm in a processing unit. Further, the results from the inverting in the processing unit are added to obtain a final calculated absorption coefficient.

Prior to operation, a series of measurements are made with real diamonds to obtain the measured absorption coefficient during a calibration process. During calibration, the samples are emitted with x-ray energy ranging from 1 keV-150 keV. The result is equivalent intensity measurements from luminescence and transmission modes. The values are stored in the memory of the processor to be used as reference for comparison. The values are called model species absorption coefficient. The two model species absorption coefficients are combined through a nonlinear addition and the result is used as a baseline for what is a diamond and what is not.

During operation, the samples are presented to the sensing zone and a calculation of the absorption coefficient from the two sensors is performed. The combined measured absorption coefficient is compared with the stored calibrated data to determine the level of similarity. If the correlation is 65%-100%, for any given particle, that particle can be classified as a diamond and is caused to flow into a concentrate chamber or a product collector chute, where it will later be sorted by human sorters. If the level of similarity is less than 65% then the material in the sensing zone can be regarded as waste (or non-diamond) and is left to flow to the reject stream or a product reject chute.

Because diamond quality and characteristics may differ due to amount of present impurities, a calibration process for the particular diamond pipe is done to optimize the recoveries. The minimum similarity cut-off is optimized based on the level of yield acceptable by the owner. The system has two operating sorting modes including monochromatic and polychromatic sorting. Using the values measure from firing samples with x-ray energy in the range 1 keV-150 keV, an optimal energy point can be determined which allows the sorter to operate at one energy level (monochromatic). This mode is available to the user for a case where there is a benefit in running at high throughput without compromising the quality of sorting. The sorter can also be operated in polychromatic mode where all the plotted values between 6 keV-150 keV for the model sample are compared with the measured values of the sample at the same range.

FIG. 1 depicts a system 100 for identifying and sorting partly/fully liberated diamonds in kimberlite, in accordance with the various embodiments of the present invention. The system 100 comprises a casing/enclosure 102, a feed chute 104, a conveyer belt 108, a motor and drive pulley 110, a tail pulley 112, a variable speed drive 114, a device 134, a controller 116, a signal processor 118, an x-ray generator 120, an x-ray source 122, detectors 124 and 126, a product collector chute 128, a product reject chute 130, and a pneumatic ejector 132.

The system 100 is enclosed within a casing/enclosure 102. The casing/enclosure 102 may be constructed of a material which provides physical protection of equipment of the system 100 from an external environment and attenuates x-ray radiation, thereby limiting any radiation exposure to the user/operator during operation of the system 100. The casing/enclosure 102 may be designed in compliance with the rules/regulations of a country where the system 100 is to be operated. In accordance with an example embodiment of the present invention, the casing/enclosure 102 is a metal casing that may limit human exposure to the system 100 during normal operation.

For additional safety and security for any human exposure to the radiation, all doors, panels, or access points (not shown) of the system 100 may be monitored by one or more sensors (not shown), and the x-rays cannot be generated by the x-ray generator 120 until the sensors detect complete closure of the casing/enclosure 102. The one or more sensors may be communicatively coupled to the controller 116, which in turn, controls the operation of x-ray generator 120. Additionally, during operation of the system 100, the system 100 may be configured to illuminate a strobe light (not shown) which provides an indication that x-rays are being generated, and that the system 100 is under operation.

The system 100 may be coupled to a feeding system (not shown) comprising a feed chute 104, for feeding of material 106*a*/106*b* (e.g., kimberlite) including diamonds in order to identify and/or sort partly/fully liberated diamonds from the fed material 106*a*/106*b*. In an example embodiment of the present invention, the feeding system may be, for example, but not limited to, a vibratory bowl feeder or a screen feeder for ensuring consistent feeding of the material 106*a*/106*b* into the conveyer belt 108. One skilled in the art would appreciate that the feed chute 104 may be configured to randomize and spread the material 106*a*/106*b* across the conveyer belt 108 to prevent particles of material 106*a*/106*b* sitting on top of each other. Additionally, the feed chute 104 is configured to prevent relative motion between particles of material 106*a*/106*b* and feeder belt by the time the particles approach a sensing zone 136 of the conveyer belt 108.

The system 100 may further comprise a conveying system which includes the conveyor belt 108, the motor and drive pulley 110, a tail pulley 112, and a variable speed drive 114. The conveying system is configured to function at a reference speed, which is received as a signal at the variable speed drive 114 from the controller 116. Further, the system 100 comprises a device 134 (e.g., tachometer) to measure current speed of the conveyor belt 108. The device 134 provides the measured speed of the conveyor belt 108 back to the controller 116, and the controller 116, in turn, ensures that the conveyor belt 108 is operated at a speed desired for suitable operations. The continuous measurement/monitoring of the speed of the conveyor belt 108 by the device 134 also ensures that there is no slip of the conveyor belt 108. In case of a detection of the conveyor belt 108 slip, the operation of the system 100 is immediately halted by the controller 116.

Figure 2:
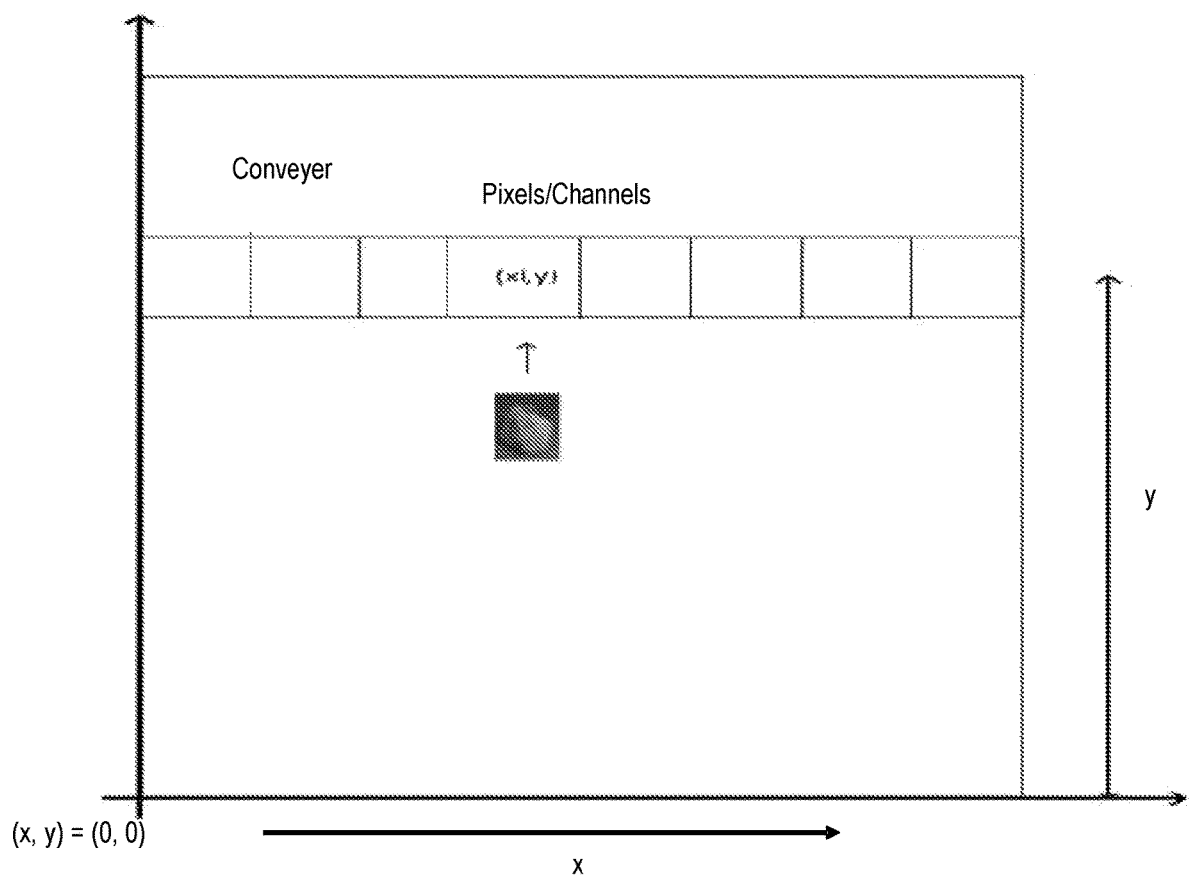
FIG. 2 depicts a segmented conveyer belt, in accordance with some embodiments of the present invention.

According to various embodiments of the present invention, the conveyor belt 108 may be virtually segmented at a position y by means of equal length division of $x_i$ for the purpose of identifying the position of each sample of the material fed to the conveyor belt 108. The sensing zone 136 has pixel or individual sensing zones adequate to cover the entire section of the belt in across form, as the motion of the conveyor belt 108 is in direction y. This segmentation may be imaginary as far as the conveyor belt 108 is concerned. In an example embodiment of the present invention, the segmentation may be provided on a line scan camera placed underneath or above or at 90°. The actual length of sensing zone 136 size depends on the smallest particle size intended to be detected. This is clearly depicted in FIG. 2. The sample of the material will be presented to the sensing zone 136 when the sample attains coordinate ($x_i$, y). As one skilled in the art would appreciate, while FIG. 2 shows sample present at one of the specific length divisions $x_i$, the sample may overlap any number of $x_i$ according to other embodiments of the present invention.

The system 100 may further include an x-ray generator 120, including a high voltage transformer (not shown). In an exemplary embodiment of the present invention, the high voltage transformer may be configured to receive a 220V ac input into the low voltage side of the transformer and output a stepped-up voltage preferably, but not limited to, in the order of 1 keV-150 keV. The output stepped-up voltage is provided to the x-ray source 122. The level of stepping up through the high voltage transformer is achieved through a tap changer. The tap changer control is achieved through a signal received from the controller 116. The signal is a fast-pulsed signal whose function is to switch the state of the tap changer from low tap to the maximum.

A voxel v(x, y)≡I(E, x, y)=<100>, where <100> is the data set containing 100 observation points as the voltage is ramped from 6 keV-150 keV. An observation point I($Et_i$, x, y) takes time $t_{Ei}$ to complete while the time to change states from $E_i$ to $E_{i+1}$ is $2t_s$, during $t_s$–$t_{Ei}$, the processor 118 carries a computation of μ($E_i$,v(x, y)) and stores it. While the number of observation points is defined to be 100, one skilled in the art would appreciate that the number of observation points can be any predefined number and the system 100 may be configured accordingly.

More specifically, a sample may be virtually segmented as per the pixel of the line scan camera as explained above. At point x, y, a rectangular section on the sample may be taken, which is called a voxel.

$$v(x,y) \equiv I(E,x,y) = <100>,$$

For every rectangular section, a number of samples may be irradiated with x-rays ranging from 1 keV-150 keV. The domain 1 keV-150 keV will be divided into 100 small divisions. In an example embodiment of the present invention, the voltage will be stepped up at increments of 1.5 keV up to 150 keV. These x-rays are emitted on that single point voxel v(x, y) or simply (x, y) coordinate. Thus, for every single point voxel, there are 100 data points. Accordingly, there for a set $I_i$={$I_1$, $I_2$, . . . , $I_{100}$}, each detector 124 and 126 will measure on its output $I_0$={$I_{o1}$, $I_{o2}$, . . . , $I_{o100}$}.

It is to be noted that μ∝$I_0$/$I_1$, and hence, there will be 100 values of μ for each (x, y). The purpose of this firing and data collection is to carry out Extended X-ray Absorption Fine Structure (EXAFS) equivalent absorption coefficient x in a polychromatic mode. As discussed previously, polychromatic mode is defined when the system is operated at different energy levels created through stepping up the voltage from 1 keV-150 keV.

$$\chi \propto \frac{\Delta \mu}{\mu_0}, \qquad (1)$$

$$\propto I_0/I_1$$

The main purpose of this activity is to solve the following equation:

$$\chi(k) = \Sigma_j \frac{N_j S_j e^{-2k^2 \sigma_j^2} e^{\frac{-2r_j}{\lambda_j(k)}} f(k)}{k\tau_j^2} \sin(2kr_j + \delta_j(k)) \qquad (2)$$

where k is the voltage/energy levels from 1 keV-150 keV. The objective of the present invention is to obtain 100 samples of $\chi(k)$ by firing the sample with 100 voltages/or x-ray energy ranging from 1 keV-150 keV, and measuring the corresponding output intensities for the respective voltage levels and doing a comparison $\chi \propto \Delta\mu/\mu_o, \propto I_0/I_1$ to obtain the hundred values of $\chi$, which is the EXAFS equivalent absorption coefficient.

Based on the collected/determined 100 values of $\chi$, the following steps are taken:

A comparison of the graph $\chi$ from unknown sample, and $\chi_m$, where $\chi_m$ is the set of 100 values stored in memory measured for a known sample (in this case, diamond). The system 100 is calibrated with real diamonds. $\chi_m$ may be obtained by firing diamonds with x-ray energy in the range 1 keV-150 keV.

A fourier transform of $\chi$ may also be performed, and the result of the same will consist of two points or graphs.

Amplitude information proportional to $f_j(k)$ and phase information $2kr_j+\delta_j(k)$. The graph $f_j(k)$ and $2kr_j+\delta_j(k)$ are unique to the species of atoms j (diamonds in the present invention).

Also it requires a comparison with model atom trends $f_m(k)$ and $2kr_m+\delta_m(k)$, which will also be obtained by calibration process with real diamonds.

The system 100 further comprises an x-ray source/tube 122, which is configured to be pulsed with accelerating voltages between 1 keV-150 keV. In turn, the x-ray source 122 is configured to produce/emit x-rays in the corresponding range 1 keV-150 keV. The x-ray source/tube 122 may be cooled against heat generated during the collision of photoelectrons with the anode.

The system 100 further comprises at least two detectors, i.e., detector 124 and detector 126. The detector 124 may be an XRT sensor which is configured to capture the transmitted x-rays through the sample. According to one embodiment of the present invention, the detector 124 may include a charge-coupled device. According to another embodiment of the present invention, the detector 124 may include a scintillating array of cells that get excited to release a current on interaction with x-rays. The XRT sensor may have a number of outputs that are mapped to each of the coordinates $(x_i, y)$ on the moving conveyor belt 108. The XRT intensity for a particle at $(x_i, y)$ for an energy level $E_j$ may be $I_T(E_j, x_i, y)$. This signal may be collected at output i of the detector 124, and is transferred to the controller 116 through the ith channel of a bus (not shown) between the detector 124 and controller 116.

The detector 126 may be an XRL sensor which is configured to capture luminescence x-rays from the sample 106b in the sensing zone 136. According to various embodiments of the present invention, the detector 126 or the XRL sensor may include either a scintillation array of cells or charge-coupled devices. The array of cells may be configured to output a current upon interaction with luminescence x-rays received from the sample 106b in the sensing zone 136. The sensor outputs may be mapped to the coordinates $(x_i, y)$ on the moving conveyor belt 108. The XRL intensity for a particle at $(x_i, y)$ for an energy level $E_j$ may be $I_L(E_j, x_i, y)$. This signal may be collected at output i of the detector 126, and is transferred to the controller 116 through the ith channel of a bus (not shown) between the detector 126 and the controller 116.

Figure 3:
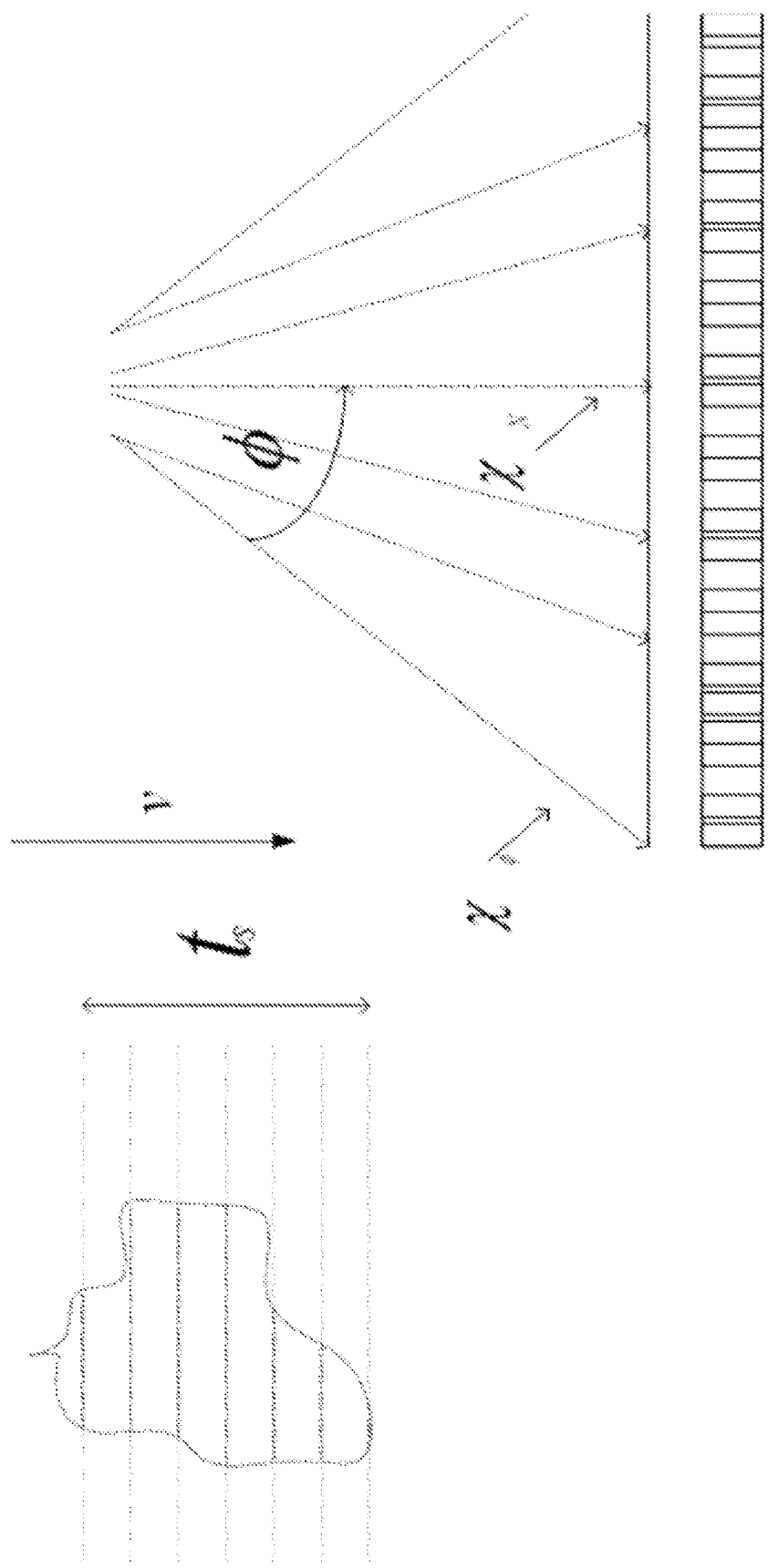
FIG. 3 depicts projection of x-rays on to sensing elements, in accordance with some embodiments of the present invention.
Figure 4:
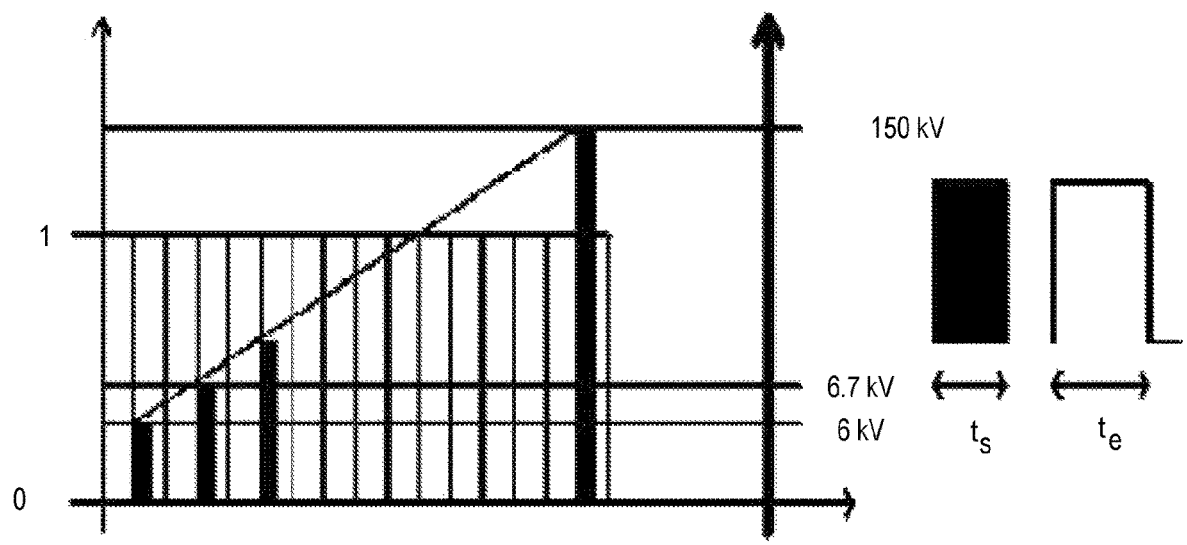
FIG. 4 depicts a timing diagram for projection of x-rays on to sensing elements, in accordance with some embodiments of the present invention.

The system 100 further comprises the signal processor 118, which is configured to carry out an x-ray projection compensation on the normal of the detector elements 124 and/or 126 plane as depicted in FIG. 3.

The intensity of radiation at 90° to the sample is $I_o$. If, for example, there are 2N+1 sensing zones within the zone 136, counting from the first pixel either left or right, the middle pixel will be at pixel N+1, and transmitted intensity associated with this point will be $I_{N+1T}: \to I_0$, (the measured intensity at N+1 is due to $I_0$). Thus, the flux of x-ray penetrating the material have an incident intensity $I_o$. However, for x-rays at an angle $\theta$ to $I_o$, let the unit normal vector parallel to flux $I_o$ be $k_o$, further if $I_\theta$ is defined to be the beam of x-rays parallel to unit vector $k_\theta$, the flux of x-rays normal to the pixel will be:

$$I_{\theta i} = \text{Proj}_{k_\theta} I_o k_o = I_o \cos\theta$$

Thus, for the pixel at $\theta$ from the normal of the sample, the corresponding incident flux intensity is $I_o \cos\theta$. This is further explained in detail below.

It is noted that for both luminescence and transmission, the absorption coefficient $\chi$ is measured against Io, where the angle between the normal of the sensing pixel is collinear with that of the incident current of photoelectrons from the x-ray source 122. All other pixels see incident current of photoelectrons at an angle.

The flux $\phi$ of any field F going through a unit surface dS is defined as:

$$\phi = F \cdot dS = |F||dS|\cos(\theta)$$

Similarly, here F=Io, the incident photo electrons, and dS=dS(x,y) is the pixel at position (x, y),
For the case when Io and dS are collinear, $\theta=0$,
Then $\phi = |I_0||dS|\cos(0) = I_o$
But when $\theta \neq 0$ $$\phi = |I_0||dS|\cos(0) = I_o \cos(\theta)$$

For luminescence, $$I_L = I_o \frac{\epsilon \Delta \Omega \mu_\chi(E)}{4\pi} \frac{\left\{1 - e^{-\left(\frac{\mu_{tot}(E)}{\sin\theta} + \frac{\mu_{tot}(E_f)}{\sin\phi}\right)t}\right\}}{\frac{\mu_{tot}(E)}{\sin\theta} + \frac{\mu_{tot}(E_f)}{\sin\phi}} \quad (3)$$

By compensation, instead of using $I_o$ as is in the above equation, for pixels making an angle with the source, $I_o$ is replaced with $I_o \cos(\theta)$.

The same applies to the transmission signal, $$I_T = I_o e^{-\mu(E)t} \quad (4)$$

As noted above, one of the objectives of the present invention is to obtain $\mu(E)$ by solving equations (3) and (4) and jointly using the results.

Note that $$\mu(E) = \mu_o(1 + \chi(E))$$

According to an embodiment of the present invention, subsequently, $\chi(E)$ (which is the EXAFS equation) is determined. So, in essence, the EXAFS data is obtained from the luminescence and transmission measurements, which in turn, is obtained from the detectors 124 and 126.

According to an embodiment of the present invention, if the EXAFS data results of luminescence are denoted as $\chi_L(E)$ and the EXAFS data results of transmission measurements are denoted as $\chi_T(E)$, then the equivalent absorption coefficient (final EXAFS data) will be:

$$\chi(E) = \chi_L(E) + \chi_T(E),$$

According to an example embodiment of the present invention, the x-ray incident and collinear with the normal of the center pixel/scintillator/channel is $\chi_N$, and all other x-rays $\{I_{\phi_i}\}$ subtend an angle $\{\phi\}$ to the normal of the plane of the scintillator. The signal processor 118 does a compensation $\{I_{\phi_i}\} \otimes \{\sec(\phi_i)\}$ to ensure all the x-rays are baselined.

The array $\{I_{\phi_i}(E)\}$ is the x-ray intensity pulsed from E=6 keV-80 keV. The signal processor 118 carries out two complementary tests. In some embodiments of the present invention, one test is sufficient to execute the desired sorting program to identify the diamonds form the material sample 106a/106b. The first test is $\{I_{\phi_i}(E=60 \text{ keV})\}$ compared with $\{I_o(E=60 \text{ keV})\}$. The second test involves comparing the array $\{I_{\phi_i}(E)\}$ with a model sample array pre-stored in the signal processor 118, such as a model sample array for (diamond) $\{I_{\phi_m}(E)\}$.

In the first test which is a monochromatic test, the test criteria are defined by:

$$\{I_{\phi_i}(E)\} = \{I_{\phi_f}(E)/I_0(E)\} + \{\ln\{I_o(E)/I_{\phi_T}(E)\}$$

In the second test, the polychromatic test, the criteria are:

$$<\text{EXAFS}a | \text{EXAFS}m>,$$

where $<x|y>$ is the cross-correlation coefficient of the data x and y. Where subscript a refers to actual measured data and subscript m is the calibrated data for the target sample on the set $\{E\}$.

The signal processor 118 may be calibrated with EXAFS model data for carbon (diamond) both in luminescence and in transmission. This embodiment derived EXAFS data may be the arithmetic sum of luminescence data and transmission data received from the detectors 124 and 126.

The intensity measurements $I_{\phi_{T_i}}(E)$ and $I_{\phi_{f_i}}(E)$ are inverted respectively into sample/particle EXAFS data. A numerical sum of the resultant EXAFS data is correlated with derived EXAFS model data.

A pre-determined criterion/threshold for similarity between the resultant EXAFS data and the EXAFS model data may be stored in the signal processor 118. According to one embodiment of the present invention, graphs may be plotted for resultant EXAFS data and the EXAFS model data, and a similarity index based on comparison of the two data is obtained. A threshold measure for the similarity index may be pre-determined and stored within the controller 116 and/or the signal processor 118. The result of the tests may be compared with the pre-determined criterion/threshold. If the criterion/threshold is met for the test(s), the diamonds are sorted/identified. For example, if the similarity index is more than a pre-defined threshold of 65%, the material sample 106a/106b may be identified as diamond.

In another exemplary embodiment of the present invention, the test can be achieved by using the Kolmogorov-Smirnov test for quantifying the distance between two empirical sets of EXAFS data. If the distance is very small, the similarity is good. Analogously, $$\text{Similarity} = 1 - D_{KS}$$

$D_{KS}$ (Kolmogorov-Smirnov—Distance) is measured between the two EXAFS data.

Further, the material sample 106a/106b may be identified as diamond when $D_{KS}$ is obtained around zero, and thus similarity is obtained around 1. As a person skilled in the art would appreciate, $D_{KS}$ is configurable by a user.

A signal corresponding to the result may be sent from the signal processor 118/controller 116 to the pneumatic ejector 132. In particular, when the result corresponds to detection of diamond in the material sample at a coordinate (x, y) of the conveyer belt 108, the pneumatic ejector 132 emits at said coordinate, thereby causing the diamonds to be projectiles in the product collector chute 128. Therefore, based on a positive result and the corresponding signal, the diamonds are ejected into the product collector chute 128. Similarly, based on a negative result and the corresponding signal, the system is configured for no emission from the pneumatic ejector 132, and the material sample 106a/106b is automatically ejected into the product reject chute 130. A person skilled in the art would appreciate that the pneumatic ejector 132 may be configured to emit in case of a negative result, i.e., when the material sample 106a/106b is not detected to be diamond, in order to have the material sample 106a/106b collected into the product reject chute 130.

The system 100 further comprises the controller 116, which is configured to transmit and receive signals between the various entities of the system 100. Based on the transmitted and received signals by the controller 116, the system 100 performs various necessary functions as described herein.

The various signals to/from the controller 116 may be categorized majorly into input and output signals. Further, the input signals may include signals from the detector 124 through an N channel bus (not shown) via an analog input card (not shown) as raw current data; signals from detector 126 through an N channel bus (not shown) via an analog card (not shown) as raw current data; signals from the signal processor 118 for instructions on the overall system 100's control; a signal from the device 134; signals from the x-ray generator 120; and signals from the VSD 114. Similarly, the output signals may include signal to the x-ray generator 120; signals to the air-driven firing ejector/selector 132; speed reference signal to the VSD. In some embodiments of the present invention, the conveyer belt 108 setpoint and control may be programmed in the VSD 114. In other embodiments of the present invention, the total control loop is managed by the controller 116.

Depending on the desired configuration, controller 116/signal processor 118 may be of any type including but not limited to a microprocessor (μP), a microcontroller (μC), a digital signal processor (DSP), or any combination thereof. Controller 116/signal processor 118 may include one more levels of caching, such as a level one cache and a level two cache, a processor core, and registers. An example processor core may include an arithmetic logic unit (ALU), a floating point unit (FPU), a digital signal processing core (DSP Core), or any combination thereof. An example memory controller may also be used with controller 116/signal processor 118, or in some implementations memory controller may be an internal part of the controller 116/signal processor 118.

Depending on the desired configuration, a system memory may be included within the controller 116/signal processor 118. The system memory may be of any type including but not limited to volatile memory (such as RAM), non-volatile memory (such as ROM, flash memory, etc.) or any combination thereof. System memory may include an operating system, one or more applications, and program data. System memory may further include a document interaction evaluation algorithm that is arranged to perform the functions as described herein including those described with respect to system 100 of FIG. 1.

System memory may be implemented by way of removable storage devices and non-removable storage devices, which are examples of computer storage media. Computer storage media includes, but is not limited to, RAM, ROM, EEPROM, flash memory or other memory technology, CD- ROM, digital versatile disks (DVDs) or other optical storage, magnetic cassettes, magnetic tape, magnetic disk storage or other magnetic storage devices, or any other medium which may be used to store the desired information and which may be accessed by the controller 116/signal processor 118. Any such computer storage media may be part of the controller 116/signal processor 118.

The system 100 further comprises the pneumatic ejector 132. The pneumatic ejector 132 or a firing system may include means of a bank of air solenoid valves. Geometrically, one solenoid valve can cover N number of channels, or in some embodiments, especially for large particle system one or two solenoids is targeted for a specific position ($x_i$, y). The solenoid valves assigned for ($x_i$, y) are actuated by a controller output signal i on a bus between the controller 116 and pneumatic ejector 132.

The system 100 further comprises the product collector chute 128 and product reject chute 130. These two chutes 128 and 130 respectively are configured to carry the sorted diamonds and remaining material from material sample 106a/106b. The chute 128 may lead to a human hand sorter station (not shown), where the further processing of sorted/identified diamonds occurs. Similarly, the chute 130 may be configured to carry the material into another conveyor belt system, where the remaining sample/material sample 106a/106b may be recycled.

In operation, the system 100 receives input material sample 106a/106b from a feeding system (not shown). The material sample 106a/106b is admitted onto the conveyer belt 108 through a feed chute 104. Subsequently, the material sample 106a/106b is transported to the sensing zone 136. The speed of the conveyor belt is controlled by the motor 110 driven by a variable frequency drive 114, which receives a signal corresponding to the speed from the controller 116. Also, the current speed of the belt is continuously sensed/monitored by the device 134 (e.g., tachometer) and shared with the controller 116 via a corresponding signal. The system 100 may further be configured to halt its operation if the device 134 does not provide the signal corresponding to current speed. The controller 116 controls the ramping up of accelerating voltage by stepping up the transformer included in the x-ray generator 120, which in turn, powers the X-ray source 122 with high voltage in order to generate x-rays from 6 keV to about 80 keV. The generated x-rays are transmitted through the material sample 106a/106b in the sensing zone 136.

Further, the luminescence data or measurements, corresponding to luminescence produced by the material sample 106a/106b in the sensing responsive to x-rays transmission, is captured through the detector 126. Also, the detector 124 captures transmissive data or measurements, which corresponds to x-rays transmitted through the material sample 106a/106b in the sensing zone 136. The signal processor 118 is configured to store threshold criteria for what is diamond and what is not. Specifically, the signal processor may be configured to store two different types of data criteria, viz., monochromatic data and polychromatic data. The signal processor 118 makes an x-ray projection onto normal of detector plane compensation of the signals from either detector and computes the addition of luminescence direct contrast ratio, and the inverse logarithm of the transmission data in the monochromatic space. The actual data is then compared with the pre-stored data/criterion. The x-ray is ramped up from 1 keV-80 keV in a cycle that ensures that sampled data is captured, analyzed, and a determination of the diamond in the material sample 106a/106b, such that no material gaps are left in the sample between clocking times.

The values of the data at 60 keV are selected from the entire array to allow for monochromatic testing. Input calibrated data is stored in the processor 116 which includes EXAFS trends of model element (e.g., carbon) at different energies. A correlation of the actual sample trend and model element is performed to establish the level of similarity, and thereby identifying the diamonds. A statistical estimation is performed, and a determination is made based on the level of similarity.

According to the various embodiments of the present invention, the current approach leverages variations of measured radiation intensity dI/dt for both luminescence $I_L$ and transmission $I_T$ and defines a new parameter, which is a surrogate material absorption coefficient by performing a non linear addition of the ratio of the following ratios (discussed hereinafter) which is independent of thickness and energy. Further, the above approach is valid both for monochromatic and polychromatic sorting discussed herein. In polychromatic sorting, the EXAFS measurements are derived from $I_o$ versus $I_L$ and $I_o$ versu $I_T$. The present invention includes provisioning for a polychromatic x-ray source 122, where one data point may be used for monochromatic sorting, and the entire set may be used for polychromatic sorting.

Based on the objective of managing self-absorption, for large material sample 106a/106b, the luminescence data at 150 keV may be considered, else other material sample size ranges will be irradiated with any energy between 1 keV and 150 keV.

MONOCHROMATIC SORTING—Luminescence ratio $I_L/I_o$ and Transmission ratio ln $I_o/I_T$ are used to define a new parameter μ. This stems from the following:

$$I_L = \frac{I_o \epsilon \Delta \Omega \mu_\chi(E)}{4\pi} \frac{\left\{1 - \left\{e^{-\left(\frac{\mu_{tot}(E)}{\sin\theta} + \frac{\mu_{tot}(E_f)}{\sin\phi}\right)t}\right\}\right\}}{\left[\frac{\mu_{tot}(E)}{\sin\theta} + \frac{\mu_{tot}(E_f)}{\sin\phi}\right]} \quad (5)$$

which is the equation for luminescence intensity at the detector 126. The above equation has to be solved for $\mu_\chi(E)$, but $\mu_{tot}(E)$ is also a function of $\mu_\chi(E)$, making this a transcendental equation which is hard to solve directly except for using a Newton Rapson approach. Generally, to solve the above equation, device simplifying assumptions are taken into consideration which are based on two aspects. The thickness t—Material sample 106a/106b composition, i.e., whether or not the sample is pure or balance concentration or dilute.

Pure means $\mu_{tot}(E) = \mu_\chi(E)$,

Balanced means $\mu_{tot}(E) = \mu_\chi(E) + \mu_{other}(E)$, where $\mu_{other}(E)$ is for impurities.

Thickness Assumptions—According to various embodiments of the present invention, the x-ray energy is used at 60 keV, which is the optimal value for which the material samples 106a/106b have distinct absorption coefficient.

Thin Samples i.e., the values of t which makes the product $$\left(\frac{\mu_{tot}(E)}{\sin\theta} + \frac{\mu_{tot}(E_f)}{\sin\phi}\right)t < 0.404$$

when this is the case, the exponent $$e^{-\left(\frac{\mu_{tot}(E)}{\sin\theta} + \frac{\mu_{tot}(E_f)}{\sin\phi}\right)t}$$

can be estimated as $$e^{-\left(\frac{\mu_{tot}(E)}{\sin\theta} + \frac{\mu_{tot}(E_f)}{\sin\phi}\right)t} \approx 1 - \left(\frac{\mu_{tot}(E)}{\sin\theta} + \frac{\mu_{tot}(E_f)}{\sin\phi}\right)t$$

Allowing to re-write equation (5) as:

$$I_L = \frac{I_o \epsilon \Delta\Omega \mu_\chi(E)}{4\pi} \frac{\left\{1 - \left(1 - \frac{\mu_{tot}(E)}{\sin\theta} + \frac{\mu_{tot}(E_f)}{\sin\phi}\right)t\right\}}{\left[\frac{\mu_{tot}(E)}{\sin\theta} + \frac{\mu_{tot}(E_f)}{\sin\phi}\right]}$$

Simplifying to $$I_L = \frac{I_o \epsilon \Delta\Omega \mu_\chi(E)}{4\pi} \frac{\left\{\left(\frac{\mu_{tot}(E)}{\sin\theta} + \frac{\mu_{tot}(E_f)}{\sin\phi}\right)t\right\}}{\left[\frac{\mu_{tot}(E)}{\sin\theta} + \frac{\mu_{tot}(E_f)}{\sin\phi}\right]} \quad (6)$$

Or $$I_L = \frac{I_o \epsilon \Delta\Omega \mu_\chi(E)t}{4\pi}$$

By inverting equation (6) to get $\mu_\chi(E)$, Luminescence ratio at thin sample range may be determined to be:

$$\mu_\chi(E) = \frac{I_L}{I_0} \times \left[\frac{4\pi}{\epsilon \Delta\Omega t}\right]$$

Consequently, $I_L/I_o$ can be measured, while $4\pi/\epsilon\Delta\Omega$ are properties of the detector, which themselves can be optimized for the best $\mu_\chi(E)$ measurement.

Implication of Above Condition:

$$e^{-x} = 1 - x \text{ for } x < 0.4$$

To recover diamonds in particles for which 70% is diamond and 30% waste, this gives:

$$\mu_{tot}(E_{60}) = \mu_\chi(E_{60}) + \mu_{other}(E_{60}) = 0.4933$$

$$x = 0.4933 t < 0.4,$$

$$t < 0.8190 \text{ cm} = 8.2 \text{ mm}$$

The other extreme comes from approximating.

$$e^{-x} = 0$$

This happens when x>1.616 (this gives t>32 mm, for $\mu_{tot}$(E=60 kV)=0.4933 It means that the equation (5) can be estimated as $$I_L = \frac{I_o \epsilon \Delta\Omega \mu_\chi(E)}{4\pi} \frac{1}{\left(\frac{\mu_{tot}(E)}{\sin\theta} + \frac{\mu_{tot}(E_f)}{\sin\phi}\right)}$$

But the component $\mu_{tot}(E)/\sin\theta$ is a function of energy E and causes $I_L$ to be diminished, causing a sine phenomenon called self-absorption.

The best value of x-ray energy that gives the best measurement of intensity under thick sample is at E=150 keV. This is determined as a critical feature in self-absorption mitigation for Luminescence intensity measurement.

Geometrical Configuration of the XRL Detector.

Here, the term in the $$\frac{\mu_{tot}(E)}{\sin\theta} < \frac{\mu_{tot}(E_f)}{\sin\phi}$$

is needed such that $$\frac{\mu_{tot}(E)}{\sin\theta} + \frac{\mu_{tot}(E_f)}{\sin\phi} \approx \frac{\mu_{tot}(E_f)}{\sin\phi}$$

According to various embodiments of the present invention, θ, i.e., the incident x-rays to be perpendicular to the sample, and φ, the exit angle to be very small π/12. A self-absorption correction for XRL measurement is thereby achieved.

According to the various embodiments of the present invention, the derivation carters for: t<8 mm and t>32 mm, the unaccounted gap 10-32 mm. XRL performs well for samples less than 10 mm, while XRT does not, and also the XRT performs well for samples greater than 10 mm.

XRT Sorting

The equation for sorting in XRT is $$I_T = I_o e^{-\mu_\chi(E)t}$$

Sorting that relies on gradient of intensities for the entire range 1.25 mm to 100 mm.

Thin samples, $$I_T \approx I_o$$

Implying that

In this region XRT suffers poor contrast because $I_o/I_T \approx \ln 1 = 0$, creating a case of poor distinction. Thus, in XRT, for good measurements with no contrast effects, it is desired that:

$$I_T \leq 0.5 I_o$$

Defining thin sample as less than 10 mm as well. This condition requires the minimum possible thickness for XRT measurements to be 10 mm.

Detection Sets

| Mode | Good | Poor |
| --- | --- | --- |
| XRL | <10 mm | >32 mm |
| XRT | >10 mm | >10 mm |

Gradient Sorting Method

According to some embodiments of the present invention, some derivatives of the XRT and XRL equations are carried out:

$$\frac{dI_L}{dt} = \frac{I_0 \epsilon \Delta \Omega \mu_x(E)}{4\pi} e^{-\mu^\theta t}$$

which is greater than zero but decreasing as a function of t, $$\frac{dI_T}{dt} = -\mu_x(E) I_0 e^{-\mu_x(E)t}$$

By defining a new parameter $D\mu_x(E)$ as $$D\mu_x(E) = \frac{dI_L}{dt} + \text{abs}\left(\frac{dI_T}{dt}\right)$$

It may be determined that:

$$D\mu_x(E) = \frac{I_0 \epsilon \Delta \Omega \mu_x(E)}{4\pi} e^{-\mu^\theta t} + \mu_x(E) I_0 e^{-\mu_x(E)t}$$

$$D\mu_x(E) = \frac{I_0 \epsilon \Delta \Omega \mu_x(E)}{4\pi} e^{-\mu^\theta t} + \mu_x(E) I_o = I_o \mu_x(E)\left(\frac{\epsilon \Delta \Omega}{4\pi} e^{-\mu^\theta t} + e^{-\mu_x(E)t}\right)$$

If $$Ks = \frac{\epsilon \Delta \Omega}{4\pi} e^{-\mu^\theta t} + e^{-\mu_x(E)t}$$

is a constant for all t, then, $$D\mu_x(E) = I_o \mu_x(E) Ks$$

$$D\mu_x(E) = \frac{I_0 \epsilon \Delta \Omega \mu_x(E)}{4\pi} e^{-\mu^\theta t} + \mu_x(E) I_o = I_o \mu_x(E)\left(\frac{\epsilon \Delta \Omega}{4\pi} e^{-\mu^\theta t} + e^{-\mu_x(E)t}\right)$$

Or $$D\mu_x(E) = I_o \mu_x(E) Ks$$

Thus, the combined derivative $D\mu_x(E)$ is unique for each material sample 106a/106b, since $\mu_x(E)$ and Ks are unique for each material, thereby a sorting method that uses measurement of Luminescence and Transmission simultaneously is being devised herein, covering the entire sorting range (1.25 mm to 100 mm), managing self-absorption and poor contrast limitations.

Figure 5:
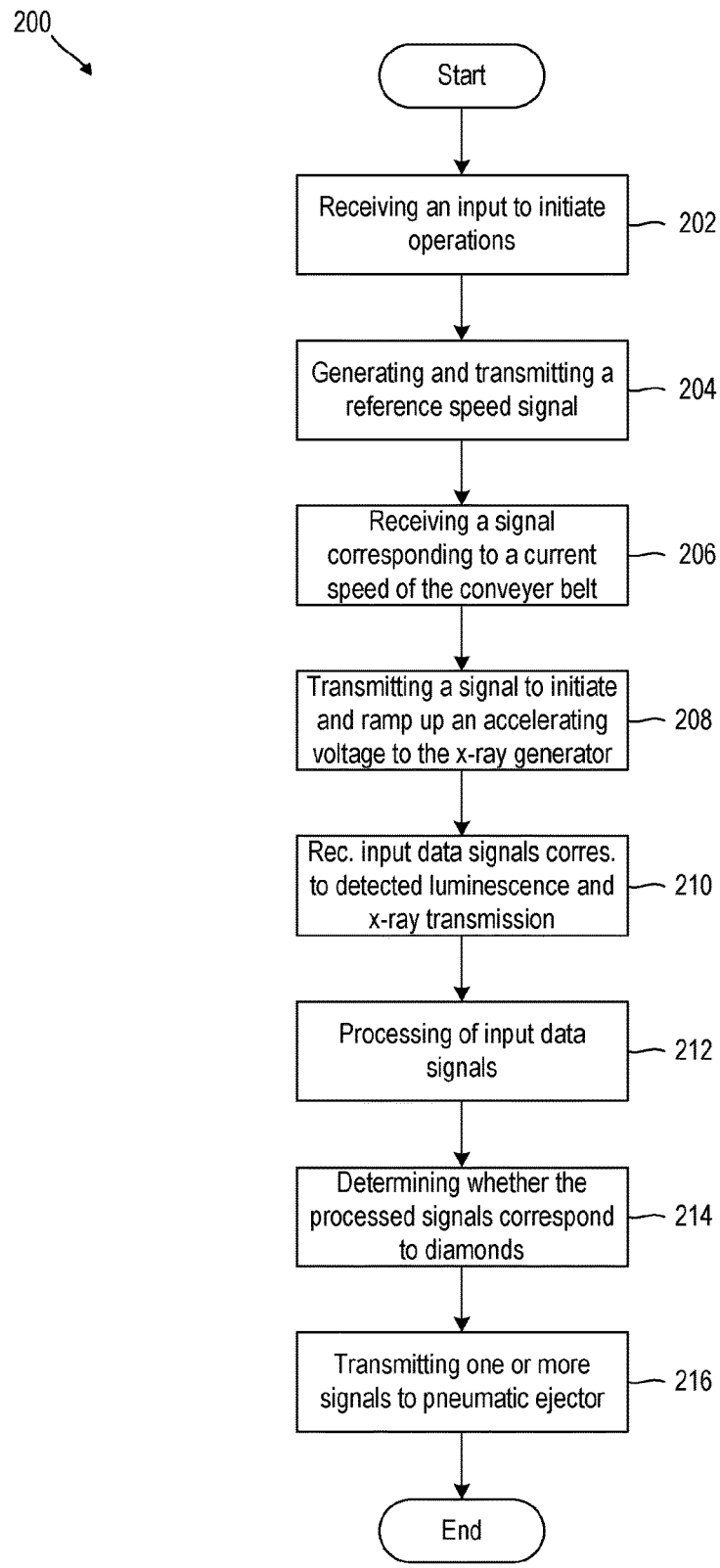
FIG. 5 illustrates a method for identifying and sorting partly/fully liberated diamonds in kimberlite, in accordance with the various embodiments of the present invention.

FIG. 5 illustrates a method 200 for identifying and sorting partly/fully liberated diamonds in kimberlite, in accordance with the various embodiments of the present invention. The method may be performed via the controller 116/signal processor 118.

At step 202, an input signal may be received to initiate operations of the system 100. The input signal may be provided to the controller 116 and/or signal processor 118, which are configured to directly interface with the user via a computing device. The examples of computing device may include, but not limited to, a server, computer, laptop, tablet, etc.

At step 204, a reference speed signal may be generated and transmitted. The reference speed signal may be generated based on pre-determined configuration of the system 100. The generated reference speed signal may be transmitted to the variable speed drive 114, to drive the conveyer belt 108 via the motor and drives pulley 110 and the tail pulley 112. In an alternative embodiment, the reference speed signal may only be generated in response a detection of all doors, panels, or access points (not shown) of the system 100 being completely closed. As discussed previously, the closure may be detected by one or more sensors, and a corresponding signal may be received at the controller 116/signal processor 118.

At step 206, a signal corresponding to a current speed of the conveyer belt 108 may be received. The signal corresponding to the current speed may be received from the input device 134 (e.g. tachometer). The received signal corresponding to the current speed may be compared to the reference speed signal transmitted at step 204, and if the difference between the two signals is more than a predefined threshold, a signal to halt the operation may be transmitted to the variable frequency drive 114. Additionally, the signal to halt the operation may also be transmitted if the signal corresponding to the current speed is not received.

At step 208, a signal to initiate and ramp up the accelerating voltage may be transmitted. The ramp-up signal may be transmitted to the x-ray generator 120, which in turn, powers the x-ray source 122 to generate x-rays.

At step 210, input data signals or measurements corresponding to the detected luminescence and x-ray transmission may be received. In accordance with various embodiments of the present invention, the luminescence and x-ray transmission data may be received from the detectors 124 and 126 based on the transmission of x-rays through the material sample 106a/106b.

At step 212, a processing of the input data signals is performed. The processing is performed by making an x-ray projection onto normal of detector plane compensation of the signals from either of the detectors 124 and 126, and by computing the addition of luminescence direct contrast ratio, and the inverse logarithm of the transmission data in the monochromatic space.

At step 214, a determination whether the processed signals correspond to diamonds is performed, thereby identifying/sorting the diamonds in the material sample 106a/106b. The steps 212 and 214 may collectively include all the steps discussed above with respect to FIG. 1 for processing of the signals. Based on the processing in step 212, the actual data is compared with the pre-stored data/criterion. The x-ray is ramped up from 1 keV-80 keV in a cycle that ensures that sampled data is captured, analyzed, and a determination of the diamond in the material sample 106a/106b, such that no material gaps are left in the sample between clocking times. The values of the data at 60 keV are selected from the entire array to allow for monochromatic testing. Input calibrated data is stored in the processor 116 which includes EXAFS trends of model element (i.e., carbon) at different energies. A correlation of the actual sample trend and model element is performed to establish the level of similarity, and thereby identifying the diamonds. A statistical estimation is performed, and a determination is made based on the level of similarity.

At step 216, one or more signals may be transmitted to a pneumatic ejector, in accordance with various embodiments of the present invention for sorting the material into product collector chute 128 and product reject chute 130.

Figure 6:
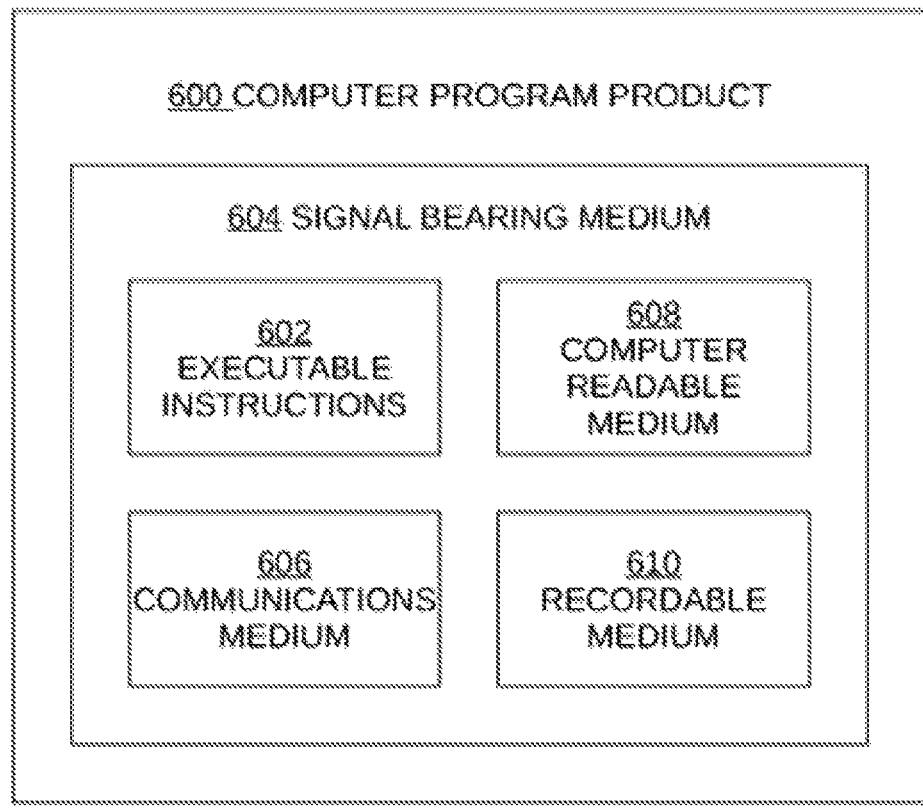
FIG. 6 illustrates an example computer program product that is configured to enable sorting/identifying of diamonds, in accordance with various embodiments of the present invention.

FIG. 6 illustrates an example computer program product that is configured to enable sorting/identifying of diamonds, in accordance with at least some embodiments described herein. The computer program product 600 may correspond to a program product stored in the form of processor executable instructions in controller 116/signal processor 118.

Computer program product 600 may include a signal bearing medium 604. Signal bearing medium 604 may include one or more instructions 602 that, when executed by, for example, a processor or controller, may provide the functionalities described above to sort/identify the diamonds from material sample 106a/106b.

In some implementations, signal bearing medium 604 may encompass a computer-readable medium 608, such as, but not limited to, a hard disk drive, a Compact Disc (CD), a Digital Video Disk (DVD), a digital tape, memory, etc. In some implementations, signal bearing medium 604 may encompass a recordable medium 610, such as, but not limited to, memory, read/write (R/W) CDs, R/W DVDs, etc. In some implementations, signal bearing medium 604 may encompass a communications medium 606, such as, but not limited to, a digital and/or an analog communication medium (e.g., a fiber optic cable, a waveguide, a wired communications link, a wireless communication link, etc.). Thus, for example, program product 600 may be conveyed to the controller 116/signal processor 118 by an RF signal bearing medium 604, where the signal bearing medium 604 is conveyed by a wireless communications medium 606 (e.g., a wireless communications medium conforming with the IEEE 802.11 standard).

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A system for sorting of diamonds, the system comprising:
   a conveying system comprising a conveyer belt to transport material sample including diamonds;
   an x-ray source configured to emit x-rays at the material sample;
   an x-ray luminescence (XRL) detector, placed around the conveyer belt, configured to measure radiated intensity of the x-rays from the material sample;
   an x-ray transmission (XRT) detector, placed below the conveyer belt, configured to measure transmitted intensity of the x-rays through the material sample; and
   a processor configured to:
      receive measurements of the radiated intensity and the transmitted intensity from the XRL detector and the XRT detector respectively;
      process the radiated intensity and the transmitted intensity measurements to determine an equivalent absorption coefficient; and
      identify the material sample, or a part of the material sample, as diamond based on a comparison between the equivalent absorption coefficient and a pre-stored model species absorption coefficient.

2. The system of claim 1, wherein the processor is configured to process the measurements of the radiated intensity and the transmitted intensity by inverting each of the measurements of the radiated intensity and the transmitted intensity.

3. The system of claim 1, wherein the x-ray source is configured to emit x-rays in a pre-defined sensing zone on the conveyer belt.

4. The system of claim 3, wherein the x-ray source is configured to emit the x-rays, at the pre-defined sensing zone, at a single energy level.

5. The system of claim 3, further comprising an x-ray generator, wherein the x-ray generator is configured to provide a series of stepped-up voltage signals to the x-ray source.

6. The system of claim 5, wherein the x-ray source is configured to emit the x-rays, at the pre-defined sensing zone, at a plurality of energy levels corresponding to the series of stepped-up voltage signals.

7. The system of claim 6, wherein the plurality of energy levels corresponds to a series of energy levels in a range of 1 keV to 150 keV.

8. The system of claim 1, wherein, to identify the material sample as diamond, the processor is configured to determine that a result of the comparison between the equivalent absorption coefficient and the pre-stored model species absorption coefficient lies in a pre-defined range.

9. The system of claim 1, further comprising a pneumatic ejector, wherein the pneumatic ejector is configured to emit at a coordinate (x, y) of the conveyer belt in response to identification of the material sample as diamond.

10. A method of sorting diamonds, the method comprising:
    transporting, by a conveying system comprising a conveyer belt, a material sample including diamonds;
    emitting, by an x-ray source, x-rays at the material sample;
    measuring, by an x-ray luminescence (XRL) detector placed around the conveyer belt, radiated intensity of the x-rays from the material sample;
    measuring, by an x-ray transmission (XRT) detector placed below the conveyer belt, transmitted intensity of the x-rays through the material sample; and
    receiving, by a processor, measurements of the radiated intensity and the transmitted intensity from the XRL detector and the XRT detector respectively;
    processing, by the processor, the radiated intensity and the transmitted intensity measurements to determine an equivalent absorption coefficient; and identifying the material sample, or a part of the material sample, as diamond based on a comparison between the equivalent absorption coefficient and a pre-stored model species absorption coefficient.

* * * * *